Figures 1, 2, 3:
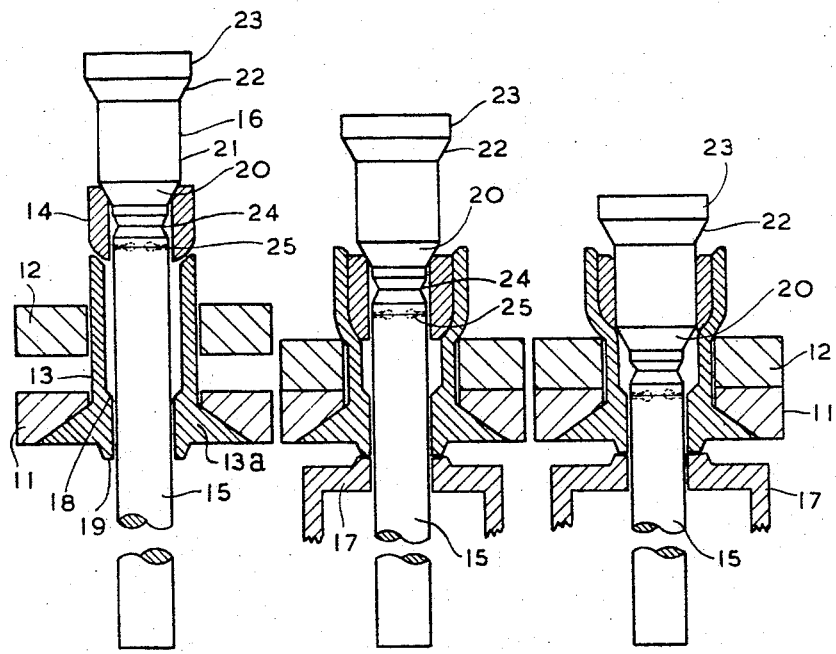

United States Patent Office 3,292,482
Patented Dec. 20, 1966

3,292,482
SELF-PLUGGING BLIND FASTENING DEVICE
Bernard Albert Gerald Fry, Welwyn Garden City, Harvey Philip Jeal, Stevenage, John Stewart Sanders, St. Albans, and Frederick Arthur Summerlin, Harpenden, England, assignors to Avdel Limited, Welwyn Garden City, England, an English joint-stock company
Filed Aug. 27, 1964, Ser. No. 392,408
Claims priority, application Great Britain, Aug. 30, 1963, 34,402/63; Oct. 30, 1963, 42,776/63
5 Claims. (Cl. 85—78)

This invention relates to self plugging blind rivet type fastening devices of the kind comprising essentially a tubular rivet with a head at one end and a mandrel having a head which is drawn into the rivet to effect placement thereof in work pieces to be fastened together and be retained within the rivet to close or plug it.

According to the invention, in a fastener of this kind a sleeve is threaded over the stem of a mandrel between the head of the latter and a tubular rivet which is also threaded over the stem, and the arrangement is such that during the placement operation the mandrel head first engages the adjacent end of the sleeve and forces the sleeve into the rivet thus expanding the projecting tail part of the latter and so clenching the work pieces together, then the mandrel head enters the sleeve expanding the latter and so further expanding the projecting part of the rivet therearound and thereafter enters the non-projecting part of the rivet within the work pieces itself to plug the rivet and expand the non-projecting part of the rivet into tight contact with the work pieces.

The mandrel head may be formed with a first taper surface extending from the mandrel stem, for engaging the outer end of the sleeve, and be of substantially constant transverse dimensions between this and a second taper surface beyond which it is of increased substantially constant transverse dimension to its free end, the arrangement being such that the second taper surface enters the sleeve further to expand the outer end part thereof and the surrounding tail end part of the rivet during the time when the first taper surface of the mandrel head and the first substantially constant transverse dimension part of the head are passing into the non-projecting part of the rivet to plug it and expand it into tight contact with the work pieces.

Preferably, the internal dimensions of the rivet are substantially greater than the transverse dimension of the mandrel stem from the tail end to a point near the head of the rivet where the latter has an internal shoulder against which the mandrel head abuts to determine the final longitudinal position of the mandrel head within the rivet; different combined thickness of the work pieces within limits being accommodated automatically by greater or less penetration of the sleeve into the tail of the rivet before the sleeve is itself penetrated by the mandrel head.

Such fixed location of the mandrel head lengthwise within the rivet simplifies positive locking of the mandrel head within the rivet, preferably by displacement of material of the rivet and/or of a collar threaded over the mandrel stem into a locking groove around the mandrel as hereinafter described.

It is a feature of the invention that a part of the mandrel head which is of constant transverse dimensions and enters the non-projecting part of the rivet within the work pieces, is knurled or otherwise formed with longitudinally extending grooves and ribs which latter bite into the rivet and/or are broken down to an extent which is dependent upon the actual transverse dimensions of the holes in the work pieces, of the rivet and of the mandrel head in any particular case. Preferably, such alternate longitudinal grooves and ribs terminate short of said first taper surface and preferably short of the second taper surface as well.

In general, the transverse dimensions of the mandrel head as measured over the knurling or ribs will be appreciably greater than as measured without the knurling or ribs. With the knurling or ribs; either tighter and more secure fastening can be obtained for a given range of dimensional tolerances, or for a given tightness or security of fastening it may be permissible for some, if not all, of the tolerance limits to be increased.

Figures 4, 5, 6:
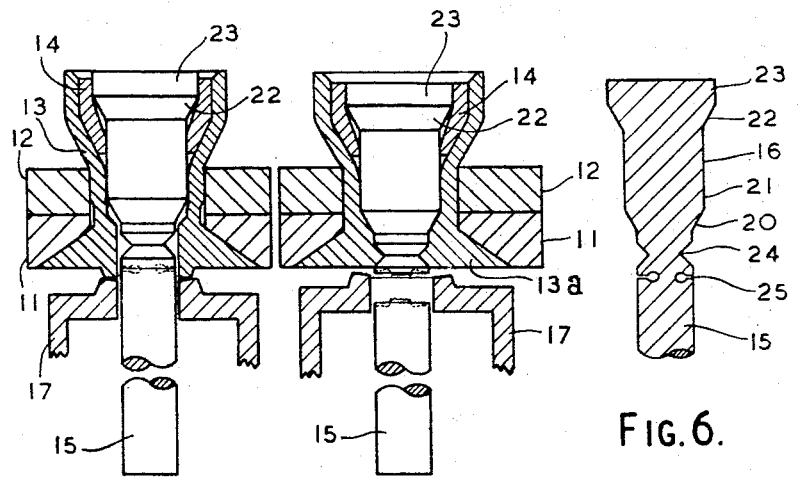
Figure 7:
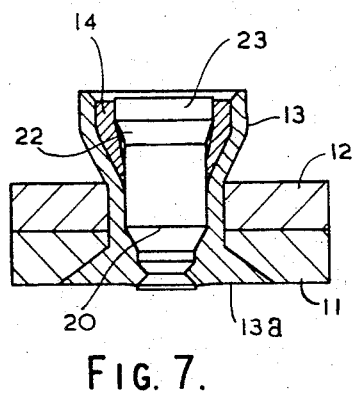
Figure 8:
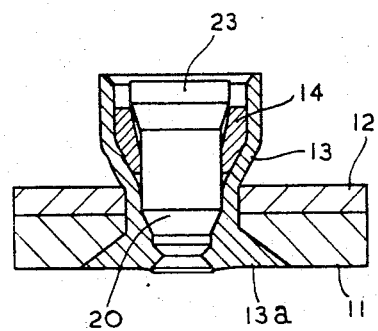
Figure 9:
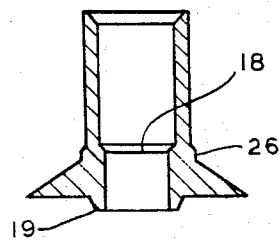
Figures 10, 11:
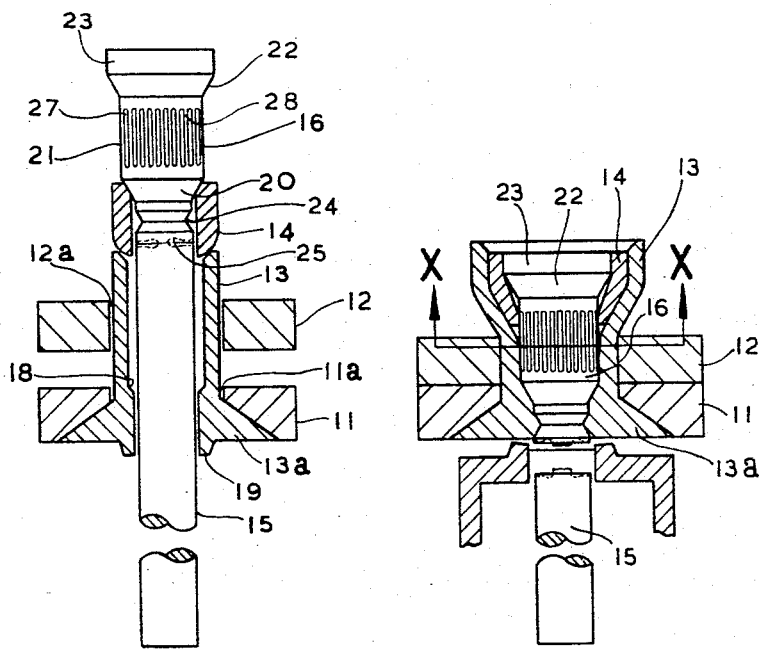
Figure 12:
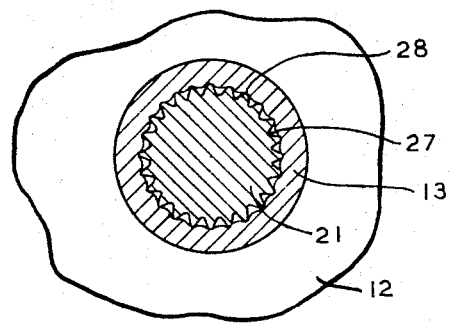
Figures 13, 14, 15:
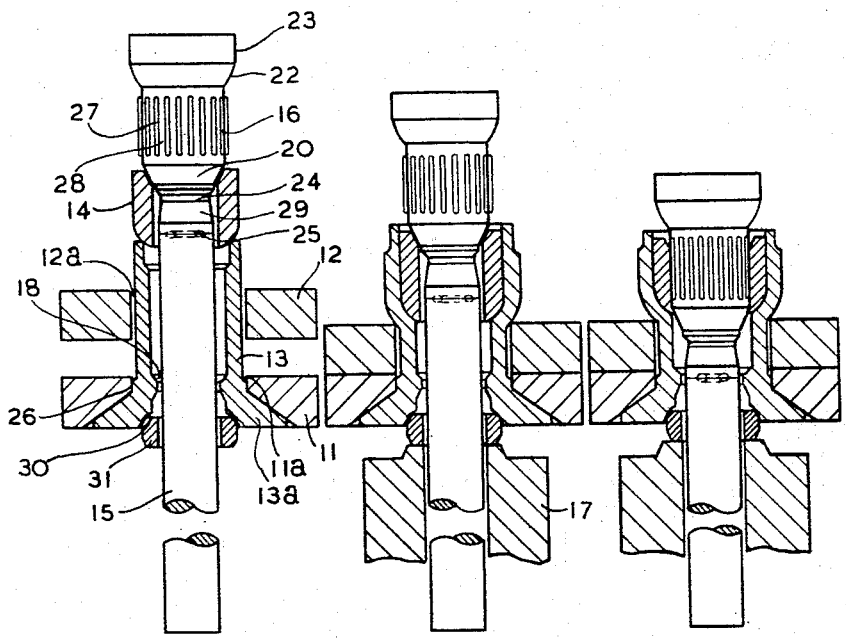
Figures 16, 17:
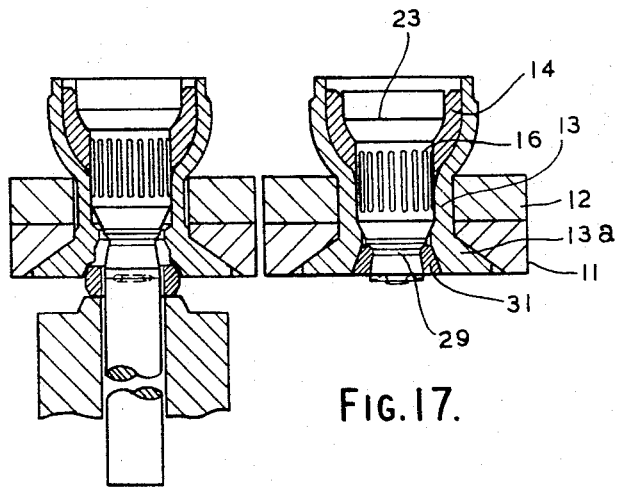

The invention is illustrated by the accompanying diagrammatic drawings (considerably enlarged but not to scale) of which:

FIGS. 1–5 show one embodiment in longitudinal section at various stages of the placement operation, FIG. 6 being a longitudinal section of the head and adjacent portion of the stem of the mandrel, FIGS. 7 and 8 show the device of FIGS. 1–5 as applied to work pieces respectively of maximum and minimum combined thickness for a given size of said device, FIG. 9 shows an unplaced rivet similar to that of the embodiment of FIGS. 1–8 but having its external diameter increased locally, FIGS. 10 and 11 are views corresponding to FIGS. 1 and 5 of a similar embodiment in which the mandrel head is formed with alternate longitudinal ribs and grooves, FIG. 12 being a cross-sectional view on the line X—X of FIG. 11, whilst FIG. 13 shows an alternative embodiment of the fastening device in longitudinal section in which a separate collar threaded over the mandrel stem is used for positively locking the mandrel in the rivet and FIGS. 14–17 are sectional elevations similar to FIG. 13 showing successive steps in the installation of the fastening device of FIG. 13.

Referring first to FIGS. 1–8 of the drawings, two work pieces to be secured together are indicated at 11 and 12, the tubular rivet at 13, and the sleeve at 14, the mandrel stem at 15 and the mandrel head is indicated generally at 16.

In FIGS. 2, 3, 4 and 5 the anvil of the usual placing tool or gun (not shown) is indicated at 17.

As shown, the tubular rivet 13 has a countersunk head 13a beyond which it is an easy clearance fit in the openings in the work pieces 11 and 12. Near its head, the rivet is formed with an internal shoulder 18 beyond which its internal diameter is substantially greater than the diameter of the mandrel stem 15. Also, the central portion of the rivet head 13a at its outer face is formed as a raised annulus 19.

The mandrel head 16 has a first taper surface 20, which extends from the mandrel stem 15 to a first cylindrical portion 21, and a second taper surface 22 which in turn extends to a second, larger diameter but shorter cylindrical portion 23.

The sleeve 14, which is short relative to the rivet 13 and an easy clearance fit over the mandrel stem 15, is of approximately the same external diameter as the rivet 13. It is tapered at one end to facilitate its entry into the rivet 13 which later is chamfered at its tail end for the same purpose.

Close to the first taper surface 20 the mandrel stem 15 is formed with a relatively shallow groove 24 and at that side of the latter remote from the surface 20 with a deeper "breaker" groove 25 which is closed upon itself, e.g. by "thread rolling," as clearly shown in FIG. 6.

During placement, the head 17 of the tool employed bears against the raised annulus 19 at the outer face of the rivet head 13a and the stem 15 of the mandrel is pulled in the usual manner to draw the mandrel head 16 into the rivet 13 and break off the stem 15 at the groove 25. The operation is as follows:

First, the sleeve 14 is brought to bear upon the tail end of the rivet 13, FIG. 1, and is then forced into the rivet expanding the projecting tail of the latter against the rear work piece 12 and so clenching the two work pieces 11 and 12 firmly together between the rivet head and the expanded part of the tail, FIG. 2. The extent to which the sleeve 14 thus penetrates the rivet 13 is dependent upon the combined thickness of the work pieces, which may vary within wide limits for any one "size" of fastening device.

Second, the first taper surface 20 and the first cylindrical portion 21 of the mandrel head enter the sleeve 14 expanding the latter and further expanding the projecting part of the rivet 13 surrounding the sleeve, FIG. 3.

Third, the first taper surface 20 and the first cylindrical part 21, now penetrating beyond the sleeve 14, enter the non-projecting part of the rivet within the work pieces 11 and 12 to plug and expand this part of the rivet 13 into intimate contact with the walls of the apertures in the latter, and, soon afterwards, the second taper surface 22 and the second larger diameter cylindrical portion 23 of the mandrel head enter the outer end part of the sleeve 14 and so further expand this and the surrounding part of the tail of the rivet 13, FIG. 4.

Fourth, the movement of the mandrel head 16 into the rivet 13 is terminated by the arrival of the first taper surface 20 of the mandrel head against the internal shoulder 18 of the rivet and then the consequently increased pressure of the anvil 17 upon the annulus 19 effectively removes the latter by displacing material of the rivet into the groove 24, and, when the latter is filled, fractures the mandrel stem at the breaker groove 25, FIG. 5, leaving the mandrel head positively held against axial movement from its plugging position in the rivet 13.

It is to be observed that the distance the sleeve 14 penetrates into the rivet 13, FIG. 2, before the sleeve is itself expanded by the entry into it of the first taper surface 20 and cylindrical portion 21 of the mandrel head, FIG. 3, is dependent upon the combined thickness of the work pieces to be fastened together in any particular case. The greater the combined work piece thickness the less be the extent to which the sleeve 14 penetrates the rivet and the greater will be the extent to which the second taper surface and second cylindrical portion 22 and 23 penetrate the sleeve 14, see FIG. 7, which shows a "maximum thickness" example. Also, the less the combined thickness of the work pieces the greater will be the extent to which the sleeve 14 penetrates the rivet 13 and the less will be the extent to which the second taper surface and second cylindrical portion 22 and 23 penetrate the sleeve 14, see FIG. 8 which shows a "minimum thickness" example.

It is just this variation of the position of the sleeve longitudinally within the rivet tail in dependence upon the combined work piece thickness which enables a fastening device according to the invention to be used with positive locking of the self plugging mandrel head over a wide range of combined work piece thickness.

It will be noted that the tubular rivet is placed and plugged by the positively locked mandrel head without any deformation of the latter.

Furthermore, in order to ensure that the external portion of the rivet wall in the region of the internal shoulder 18 (FIG. 1) is in intimate contact with the walls of the apertures in members 11 and 12, the external diameter may be locally increased in this area as indicated at 26, FIG. 9.

Turning now to the modification shown in FIGS. 10–12, here two plates to be secured together are indicated at 11 and 12 with registering holes 11a and 12a; the tubular rivet at 13, and the sleeve at 14; the stem of the mandrel at 15 and the mandrel head at 16.

The tubular rivet has a countersunk head 13a. Near its head, the rivet is formed with an internal shoulder 18 beyond which its internal diameter is substantially greater than the diameter of the mandrel stem 15. The central portion of the rivet head 13a is formed at its outer face as a raised annulus 19. The mandrel head 16 has a first taper surface 20 which extends from the mandrel stem 15 to a first cylindrical portion 21, and a second taper surface 22 which in turn extends to a second larger diameter but shorter cylindrical portion 23.

The cylindrical portion 21 of the mandrel head is formed with knurling intermediately of its length which as shown in FIG. 10, may terminate short of both taper surfaces 20 and 22.

The placement of the fastener is similar to the placement of the embodiment described above with reference to FIGS. 1–8.

The knurling on the cylindrical portion 21 of the mandrel head is preferably formed by a thread rolling operation, and comprises alternate longitudinal grooves 27 and ribs 28.

The embodiment of FIGS. 10–12 is particularly suitable for placing in rivet holes formed in sheets where tolerances of the external diameter of the rivet shank and the internal diameter of the hole in the sheets or plates are very close or where there is a gap or appreciable difference between the external diameter of the rivet shank and the internal diameter of the wall of the holes in the sheets or plates. In the case of close tolerances, the flow of the rivet material during the pull of the mandrel will fill the grooves 27 between the ribs 28 and/or the ribs 28 will be broken down during the pull, see FIG. 12. In the case where there is a gap between the rivet shank and the internal wall of the hole in the sheet or plate, the knurled mandrel can be usefully employed to close the gap completely after the placement operation as the overall diameter thereof can be several thousandths of an inch larger than it would be without the knurling.

As stated above, the placement of the fastener of FIGS. 10, 11 and 12 is similar to that of the fastener of FIGS. 1–8. However, in the case of FIGS. 10, 11 and 12, the mandrel head 16, as it enters the non-projecting part of the rivet 13, expands the latter into intimate contact with the inner wall of the hole 12a and at the same time squeezes some of the material of the rivet shank 13 into the grooves or recesses 27, see FIG. 12.

It will be understood that the positive locking of the mandrel within the rivet may be achieved otherwise than by the displacement of material of the rivet head into a groove 24 in the mandrel stem 15, as shown in FIGS. 5, 7, 8 and 11. For example, in the fastener shown in FIGS. 13 and 14 which is otherwise the same as that shown in FIGS. 1–8 of the drawings, the rivet 13 which has a local enlargement at 26 the same as that shown in FIG. 9, does not have an annulus 19 at its outer face and also the groove 24 of the mandrel stem 15 is not of simple V-shaped cross-section, but instead is of gradually tapering formation at the face 29 nearer the breaker groove 25.

Instead of the external annulus 19, the rivet 13 is internally flared and formed with an internal step as indicated at 30 in FIG. 13 and the mandrel stem 15 has threaded thereover a collar 31.

Instead of bearing upon the annulus 19 as in the case of FIGS. 1–5, the anvil member 17 of the placing tool bears upon the outer end of the collar 31, FIGS. 13–16, and the collar 31 in turn bears upon the step 30 in the flared end of the rivet 13. After the movement of the mandrel head 16 into the rivet 13 is terminated by the arrival of the first taper surface 20 against the internal shoulder 18, however, the consequently increased pressure of the anvil displaces the material of the collar 31 into the flare of the rivet and displaces the material of the latter so that the step 30 is removed and the material take up the shape shown in FIG. 17 with the groove 24 of the mandrel stem 15 entirely filled. It will be noted that the transverse dimensions of the mandrel stem 15 between the locking groove 24 and the first taper surface 20 thereof are less than the internal transverse dimensions of the rivet so that an annular space remains above the material of the collar 31 after placement is complete. It will also be observed that after placement the internal flare of the rivet 13 is of substantially the same uninterrupted taper as the face 29 of the locking groove 24 in the mandrel stem 15, so that the mandrel head 16 is held securely against upward displacement in the rivet. The step 30 effectively prevents any gripping of the mandrel stem 15 by the collar 31 as a result of premature wedging or deformation of the latter as may tend to occur if the internal flare of the rivet is initially smooth and uninterrupted.

What has been descibed above is set forth as exemplary of a teaching of the invention to enable those skilled in the art in the practice thereof. It should therefore be understood that the invention may be practised otherwise than as specifically described. What is intended as novel and desired to be protected by Letters Patent of the United States is:

We claim:
1. In a blind rivet fastening device, including
 (a) a tubular rivet,
 (b) a head at one end of the rivet,
 (c) a mandrel extended through said rivet and said head to project beyond said head,
 (d) a tail end on said rivet,
the improvement of
 (e) a mandrel head,
 (f) a tubular sleeve loosely mounted on said mandrel between said tail end and said mandrel head, said sleeve having substantially cylindrical inner and outer surfaces with the end thereof adjacent said tail end being exteriorly beveled,
 (g) a first tapered shoulder on said mandrel head adjacent said sleeve,
 (h) a second tapered shoulder on said mandrel head spaced from said first shoulder and from said sleeve,
 (i) a first cylindrical portion between said shoulders,
 (j) a second cylindrical portion extending from said second shoulder to the adjacent end of the mandrel head,
 (k) said sleeve being of about the same outer diameter as the outer diameter of said tubular rivet, said first cylindrical portion of the head being of larger diameter than the inside diameter of said sleeve, and said second cylindrical portion being of larger diameter than said first cylindrical portion, whereby during the pulling of the mandrel through said rivet and through said head for fastening the rivet said sleeve is pulled into the rivet tail and expands the rivet tail against the adjacent work piece, and then during continuing pulling of said mandrel said first shoulder and said first cylindrical portion are pulled into and through said sleeve and into said rivet for expanding said rivet in said work piece, and then during further pulling of said mandrel said second shoulder and said second cylindrical portion are pulled into said sleeve for further expanding said sleeve and said rivet tail,
 (l) and means to stop the movement of said mandrel at a predetermined penetration into said rivet.

2. The improvement in a blind rivet fastening device defined in claim 1, and
 (m) said stopping means being an inwardly projecting abutment in said rivet abutted by said first shoulder to locate said mandrel in predetermined relation to said rivet head.

3. The improvement in a blind rivet fastening device defined in claim 1, and
 (m) coacting means on said rivet head and on said mandrel for interlocking said mandrel and said rivet head in said predetermined penetration.

4. The improvement in a blind rivet fastening device defined in claim 2 and
 (n) said mandrel having an interlocking groove spaced from said first shoulder so as to be located in said rivet head when said first shoulder abuts said abutment,
 (o) and means on said rivet head adapted to be swaged into said interlocking groove for interlocking said mandrel and said rivet head.

5. The improvement in a blind rivet fastening device defined in claim 3, and
 (n) longitudinal alternating ribs and grooves on the periphery of said first cylindrical portion respectively for expanding said rivet and for receiving surplus material of said rivet in said grooves.

References Cited by the Examiner

UNITED STATES PATENTS

| | | | |
|---|---|---|---|
| 2,372,222 | 3/1945 | Mullgardt | 85—78 |
| 2,466,811 | 4/1949 | Huck | 85—78 |
| 2,538,623 | 1/1951 | Keating | 85—78 |
| 2,545,752 | 3/1951 | Singleton | 85—78 |
| 3,065,661 | 11/1962 | Kolec et al. | 85—78 |
| 3,073,205 | 1/1963 | Siebol | 85—78 |

FOREIGN PATENTS 436,238  10/1935  Great Britain.

R. S. BRITTS, *Assistant Examiner.*

THOMAS F. CALLAGHAN, *Primary Examiner.*